United States Patent [19]
White et al.

[11] Patent Number: 6,135,350
[45] Date of Patent: Oct. 24, 2000

[54] SURFACE MARKING SYSTEM AND METHOD OF VIEWING MARKING INDICIA

[75] Inventors: Timothy P. White, New Boston, N.H.; Steven M. LeBlanc, Philadelphia, Pa.

[73] Assignee: Northeast Robotics LLC, Weare, N.H.

[21] Appl. No.: 09/117,742

[22] PCT Filed: Feb. 5, 1997

[86] PCT No.: PCT/US97/01905

§ 371 Date: May 27, 1999

§ 102(e) Date: May 27, 1999

[87] PCT Pub. No.: WO97/29593

PCT Pub. Date: Aug. 14, 1997

[51] Int. Cl.$^7$ ........................................................ G06K 5/00
[52] U.S. Cl. .................................. 235/380; 235/454
[58] Field of Search ........................... 235/380, 462.01, 235/454, 379, 375; 382/3, 13, 59

[56] References Cited

U.S. PATENT DOCUMENTS

| | | | |
|---|---|---|---|
| 4,582,986 | 4/1986 | Stockburger et al. | 235/454 |
| 4,731,853 | 3/1988 | Hata et al. | 382/1 |
| 4,752,965 | 6/1988 | Dunkley et al. | 382/3 |
| 4,767,211 | 8/1988 | Munakata et al. | 356/375 |
| 4,864,108 | 9/1989 | Hamada et al. | 235/379 |
| 5,015,070 | 5/1991 | Montgomery et al. | 350/163 |
| 5,039,868 | 8/1991 | Kobayashi et al. | 250/572 |
| 5,187,611 | 2/1993 | White et al. | 359/599 |
| 5,337,358 | 8/1994 | Axelrod et al. | 380/23 |
| 5,384,859 | 1/1995 | Bolza-Schunemann et al. | 382/1 |
| 5,396,279 | 3/1995 | Vossen | 348/95 |
| 5,408,591 | 4/1995 | Shih et al. | 395/105 |
| 5,461,417 | 10/1995 | White et al. | 348/131 |
| 5,585,616 | 12/1996 | Roxby et al. | 235/472 |
| 5,606,160 | 2/1997 | Tani et al. | 235/472 |

FOREIGN PATENT DOCUMENTS 000513885A 11/1992 European Pat. Off. ............ 235/380

*Primary Examiner*—Thien Le
*Attorney, Agent, or Firm*—Davis and Bujold

[57] ABSTRACT

A surface marking system for providing a surface with a reflective marking for inspection by a vision system. The surface marking system comprises at least one corner cube cavity formed in the surface to be marked, the at least one corner cube cavity comprises three substantially planar surfaces, each of the three substantially planar surfaces extending perpendicular to one another. The three substantially planar surfaces intersecting one another at a point common to all of the three substantially planar surfaces and a ridge is formed between each of the mating adjacent pairs of the three substantially planar surfaces. An impact tool with the desire geometry or etched art work is employed to form the corner cube cavities. A method is also disclosed of inspecting the marking indicia on a surface comprising a light source, a collimating lens for collimating the light, and a mirror for reflecting the light toward a beam splitter which transmits a portion of the light toward the surface of the object where it is reflected by the corner cube cavities back toward and through the beam splitter where it is sensed by a sensing device.

20 Claims, 12 Drawing Sheets

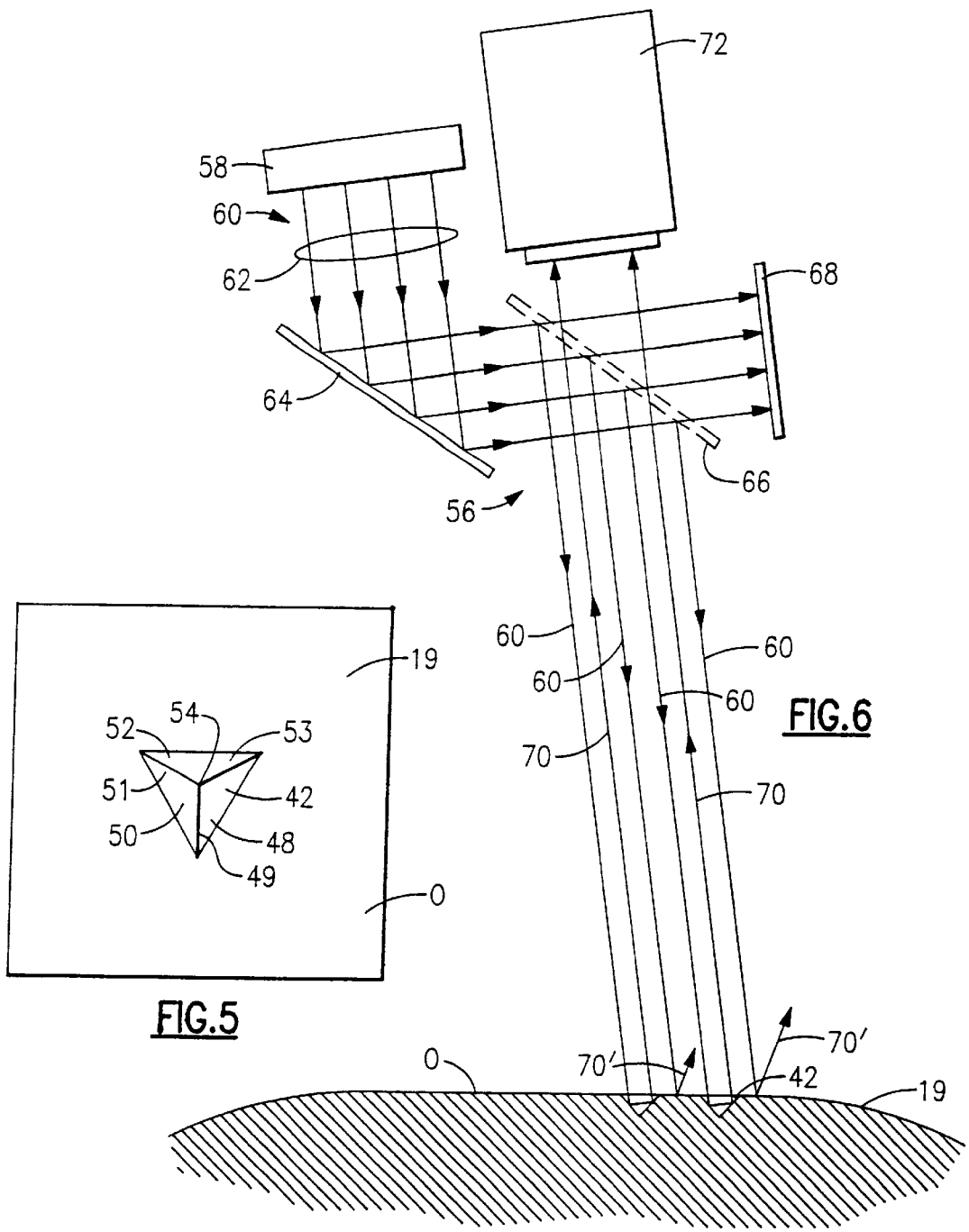

SURFACE MARKING SYSTEM AND METHOD OF VIEWING MARKING INDICIA

This invention relates to marking a surface with at least one planar surface, and preferably marking with a corner cube cavity, and the accurate viewing of such marking on a surface of an object, especially a highly polished flat or curved metallic surface. The invention is also applicable to virtually any surface capable of receiving an optically reflective surface finish.

Marking systems and methods for marking surfaces of objects are well known in the art. The typical marking indicia employed in these conventional systems are dots or recesses, usually having a conical or spherical shape. Such prior art marking indicia are typically formed by a conically or spherically shaped stylus, which is forced or stamped into the surface of the object to be marked via a stamping machine, thereby leaving a conical or spherical recess in the surface (FIGS. 7A and 7B).

Vision systems, using video cameras and/or sensors, are typically employed in a manufacturing environment to detect such marking indicia to determine the type, style, size, model, make, serial number, part number, etc., of the product carrying the marking indicia. A light source typically accompanies the video camera and/or sensor in order to aid in detection of the marking indicia. However, the conventional marking indicia of the prior art marking systems do not reflect all of the light received from the light source back to the video camera and/or sensor due to the geometry of the recess, thereby decreasing the accuracy of the vision system. Further, when conventional marking indicia is viewed by the video camera and/or sensor from a variety of different viewing angles, the amount of light reflected back by the marking indicia varies as well thereby making it difficult to accurately view the marking indicia.

The term "corner cube cavity", when used in the specification and in the appended claims, includes any formed cavity which comprises three substantially planar or effectively planar surfaces, with each substantially planar or effectively planar surface extending perpendicular to the other two substantially planar or effectively planar surfaces and all three substantially planar or effectively planar surfaces having one common intersection area or point. It is to be appreciated that the interface or joint between any two intersecting planar surfaces may be slightly radiused, i.e. the common intersection point and the three ridges of a tool employed to form the corner cube cavity may have a slight radius to prolong the useful life of the tool. The radius of curvature of the intersection point and the three ridges must be controlled and should not be any greater than about 5–10% of the overall depth of the cavity to be form in the surface by the tool.

The term "effectively planar surface", when used in this specification and in the appended claims, means any surface area or surface profile which reflects light in substantially the same manner as a complete planar surface.

Wherefore, it is an object of the present invention to overcome the aforementioned problems and drawbacks associated with the prior art designs by facilitating effective and accurate viewing of marking indicia, even on a highly polished flat or curved metallic surface.

Another object of the invention is to provide an improved marking system which will create a substantially corner cube indentation or cavity in a surface to be marked.

Still another object of the invention is to provide an improved inspection system which, in combination with the improved marking system, facilitates accurate viewing of the marking indicia from a wide range of inspection angles, i.e. plus or minus 35 degrees relative to a central axis extending normal to the marking indicia cavity.

Yet another object of the invention is to project light from a light source onto a surface containing a corner cube indentation or cavity and view the light reflected from the corner cube indentation or cavity with a sensing device to determine the existence of markings or a pattern arrangement of the markings on the surface.

A further object of the invention is to provide a marking system which is completely compatible with existing equipment and insensitive to various surface colors or finishes.

The present invention relates to a surface marking system for providing a surface with a reflective marking for inspection by a vision system, said surface marking system comprising: means for forming at least one corner cube cavity in the surface to be marked, the at least one corner cube cavity comprising three surfaces, each of said three surfaces being perpendicular to one another, said three surfaces intersecting one another at a point common to all of said three surfaces and a ridge being formed between each of mating adjacent pairs of said three substantially planar surfaces.

The present invention also relates to a method of marking a surface with a reflective marking for viewing by an inspection system, said method comprising the steps of: forming at least one corner cube cavity in the surface to be marked, the at least one corner cube cavity comprising three surfaces, each of said three surfaces being perpendicular to one another, said three surfaces intersecting one another at a point common to all of said three surfaces and a ridge being formed between each of mating adjacent pairs of said three surfaces.

The invention will now be described, by way of example, with reference to the accompanying drawings, in which:

FIG. 5 is a diagrammatic top plan view of a corner cube cavity formed in a surface according to the present invention;

FIG. 6 is a diagrammatic partial cross-sectional view of a second embodiment of a viewing apparatus according to the present invention;

Figure 7C:
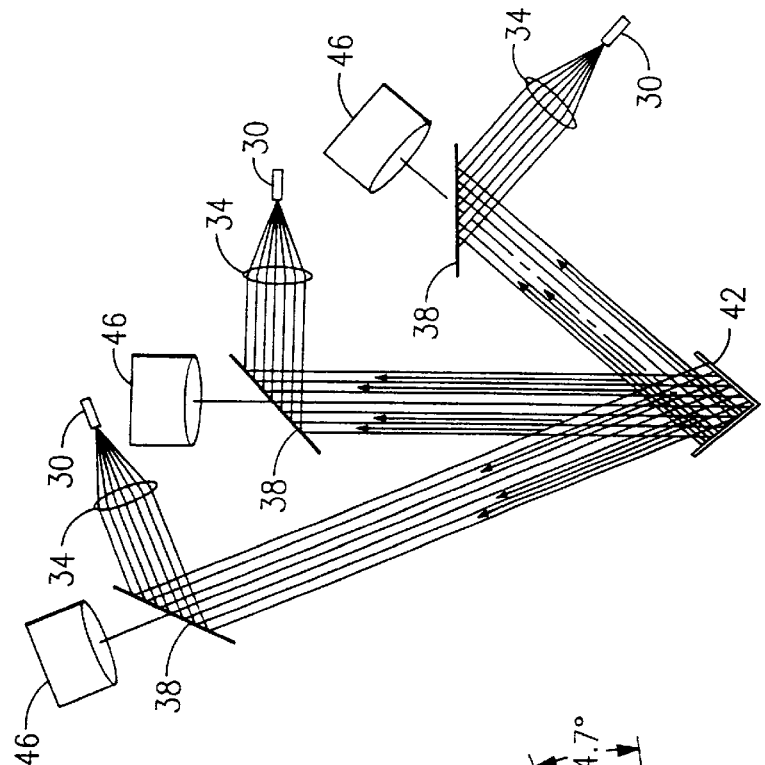
Figure 7B:
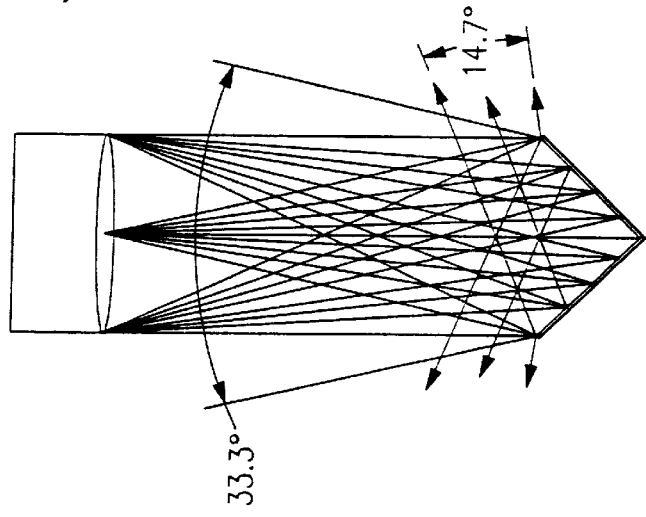
Figure 7A:
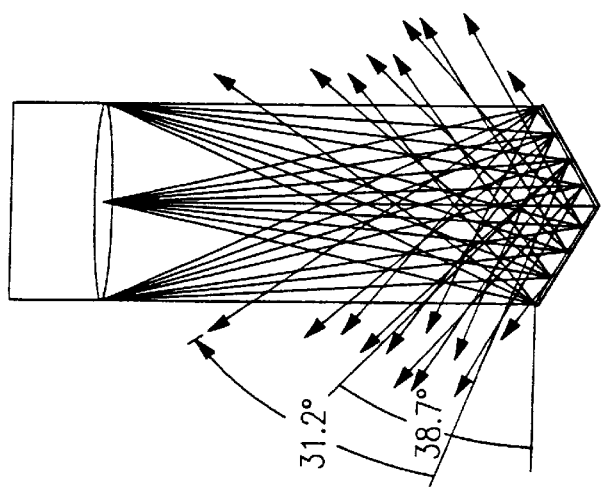
Figure 8:
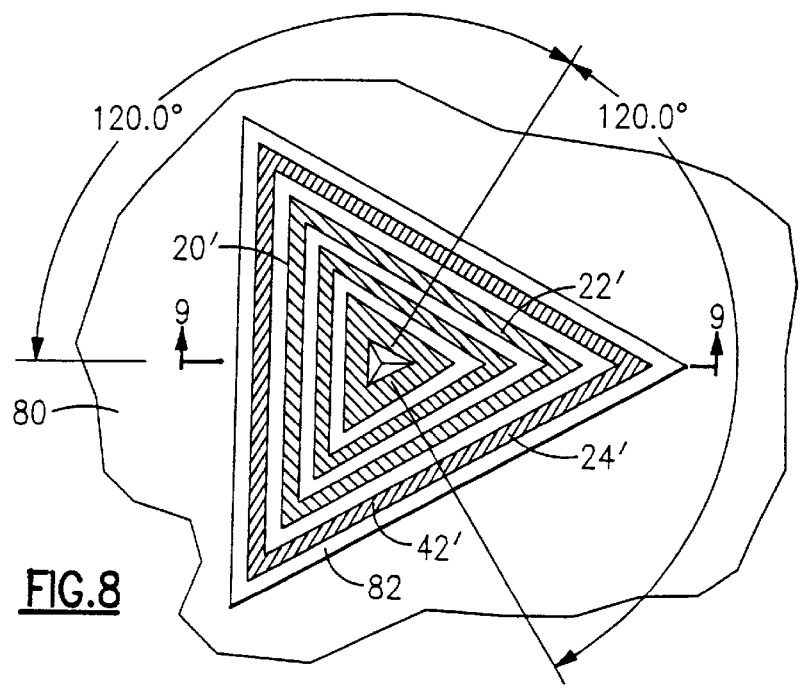
Figure 9:
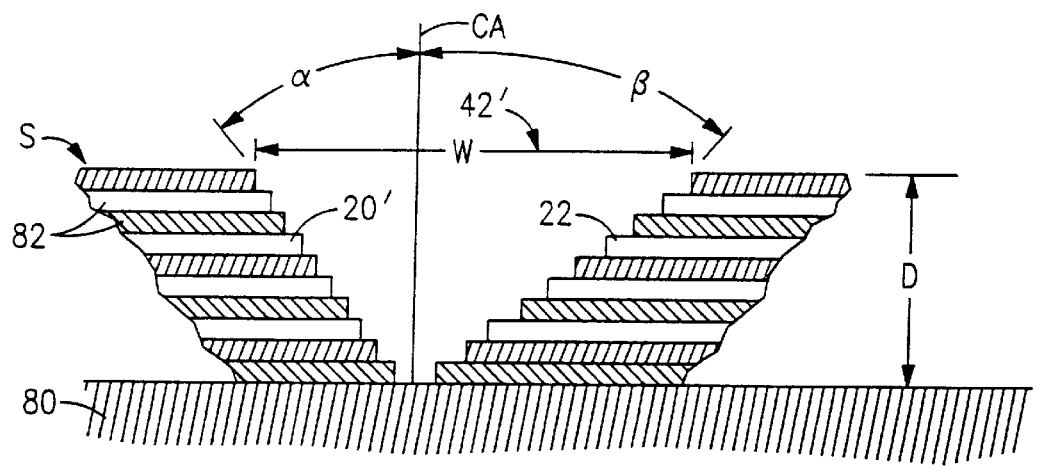
Figure 10:
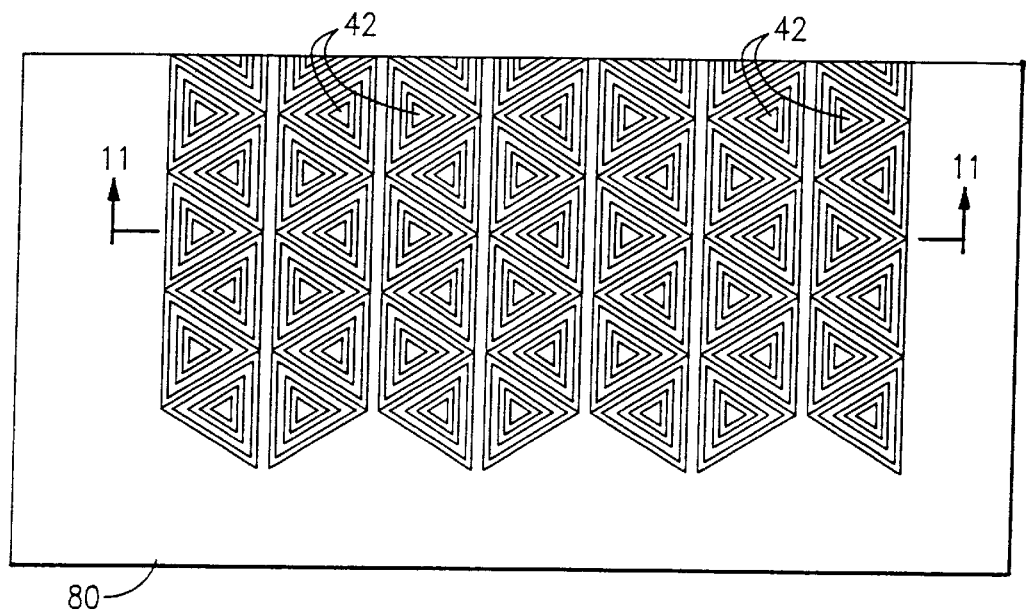
Figure 11:
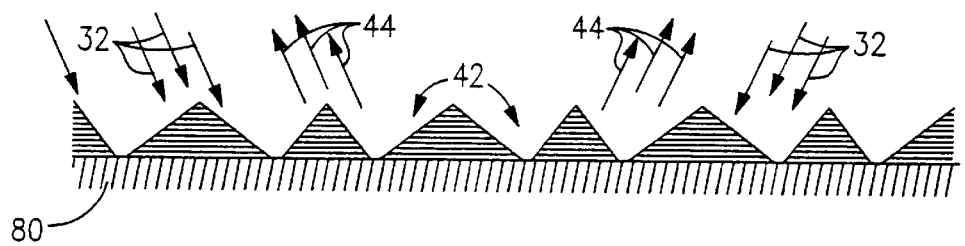
Figure 12:
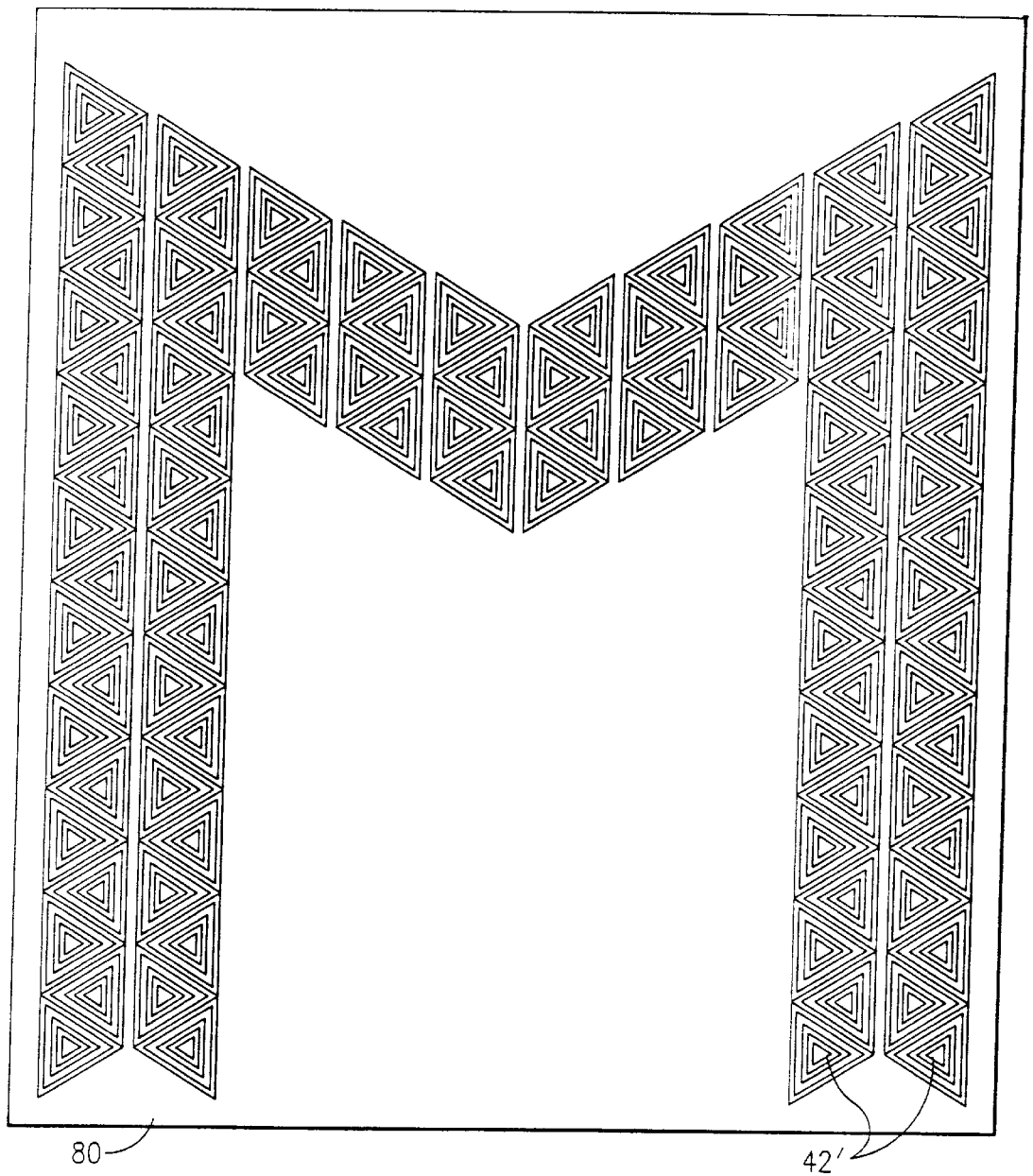
Figure 13:
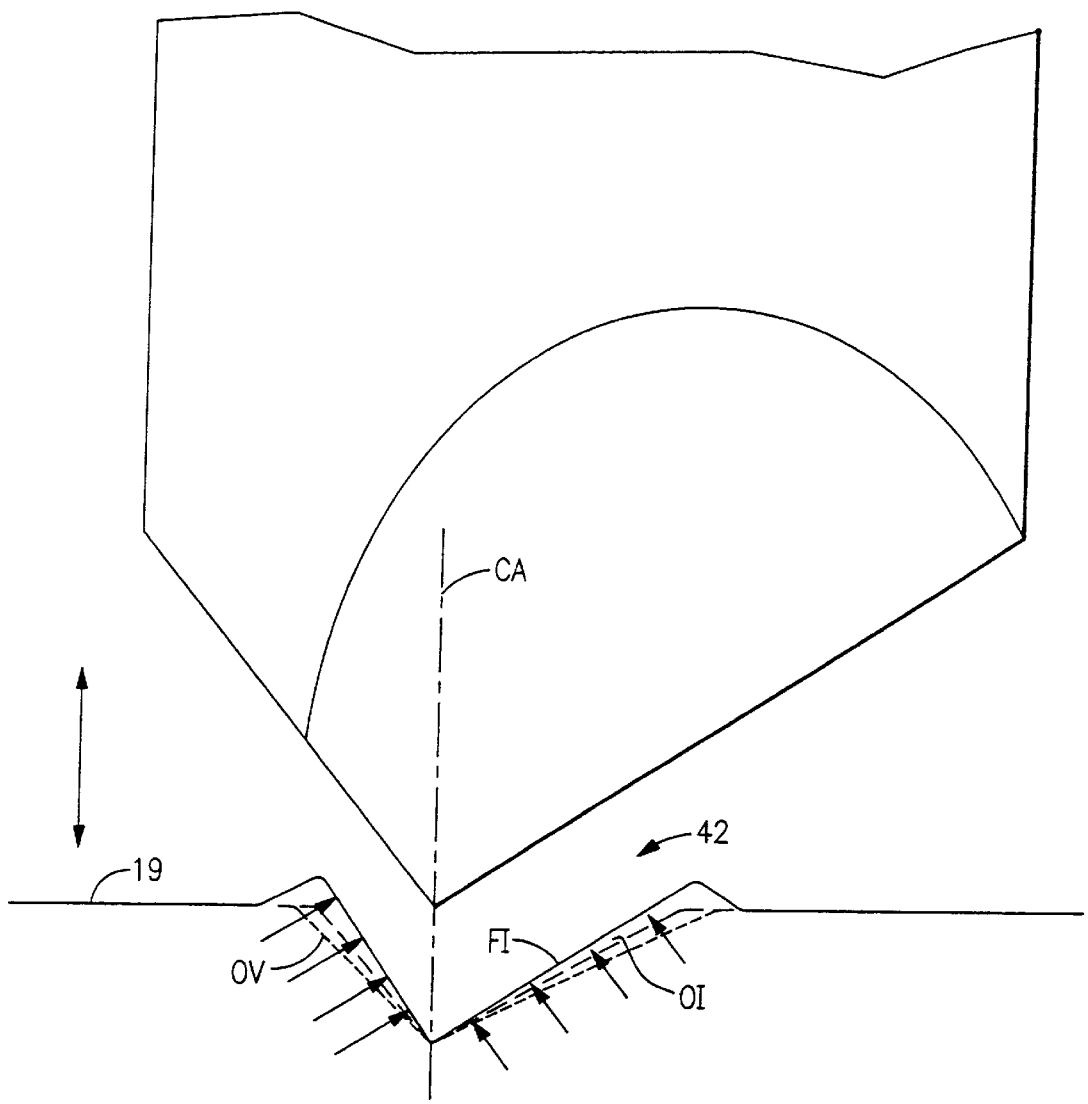
Figure 14:
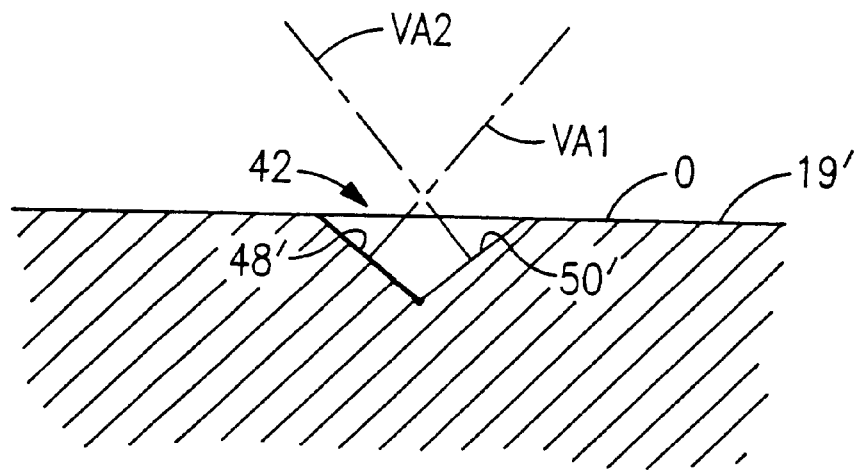
Figure 15:
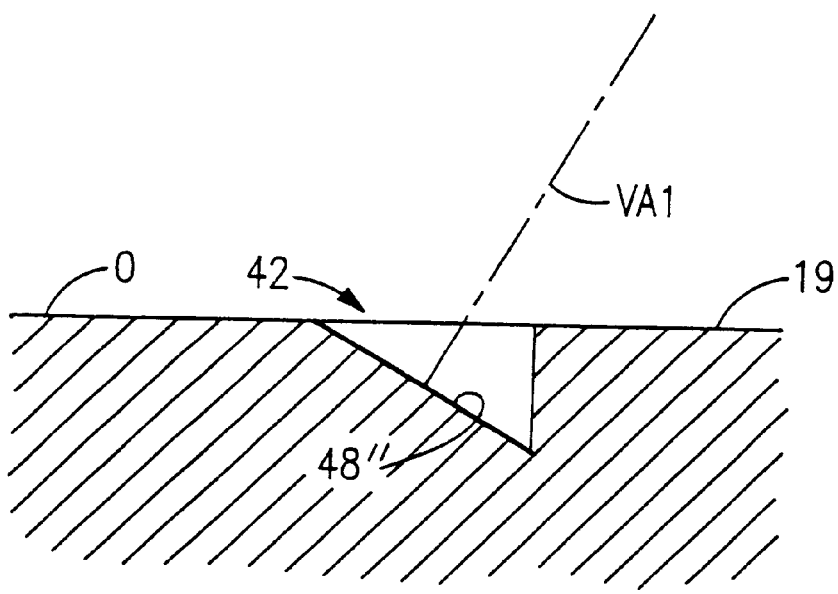

FIG. 7A diagrammatically shows ray tracing for a 1200 cone indentation;

FIG. 7B diagrammatically shows ray tracing for a 900 cone indentation;

FIG. 7C diagrammatically shows ray tracing for a corner cube indentation according to the present invention;

FIG. 8 is a diagrammatic top plan view of an etched corner cube cavity formed in a surface according to the present invention;

FIG. 9 is a diagrammatic cross-sectional view of FIG. 8 taken along section line 9—9;

FIG. 10 is a diagrammatic top plan view of a plurality of etched corner cube cavities formed in a surface;

FIG. 11 is a diagrammatic cross-sectional view of FIG. 10, taken along section line 11—11, diagrammatically showing light being reflected back parallel to the supplied light source;

FIG. 12 is a diagrammatic top plan view of an etched letter "M" formed according to the present invention;

FIG. 13 is a diagrammatic representation showing the "spring-back" of a marked surface once the impact tool is withdrawn;

FIG. 14 is a diagrammatic view showing an imprinted mark having two reflective planar surfaces; and FIG. 15 is a diagrammatic view showing an imprinted mark with a single reflective planar surface.

Figures 16, 17:
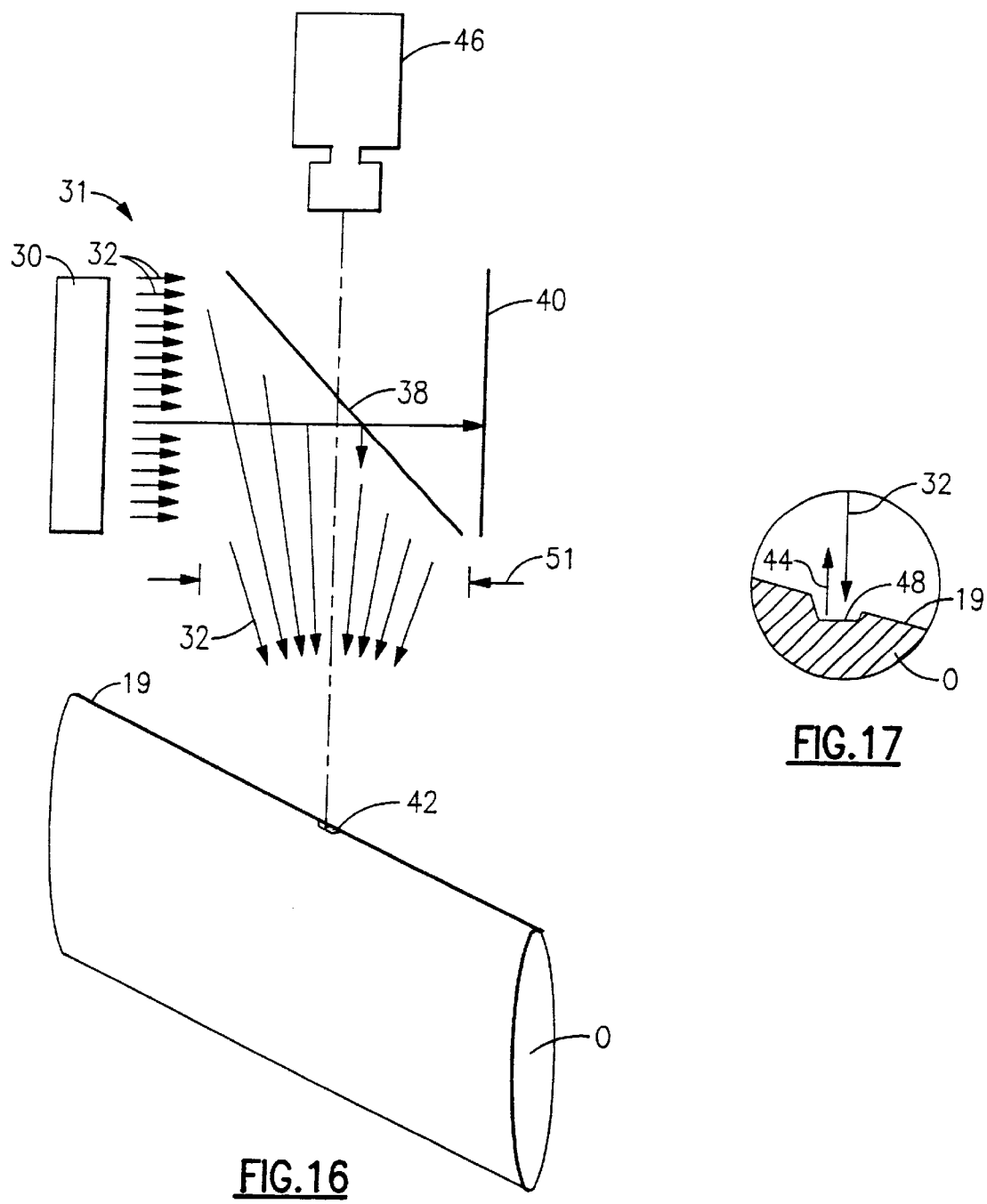
Figure 18:
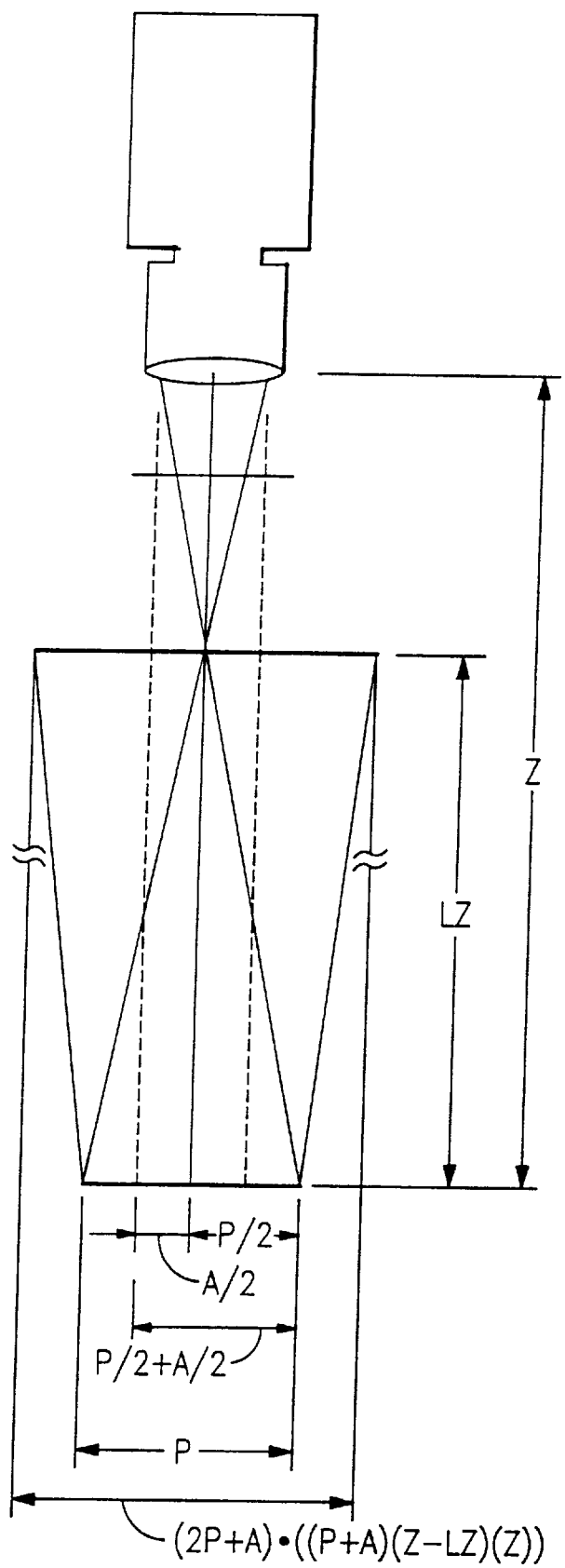

FIG. 16 is a diagrammatic view showing a further embodiment of the viewing apparatus according to the present invention;

FIG. 17 is an exploded partial cross-sectional view of FIG. 16 showing the cavity formed in the surface of the object; and FIG. 18 is a diagrammatic view showing the parameters used to calculate the size of the illumination device.

Figure 1:
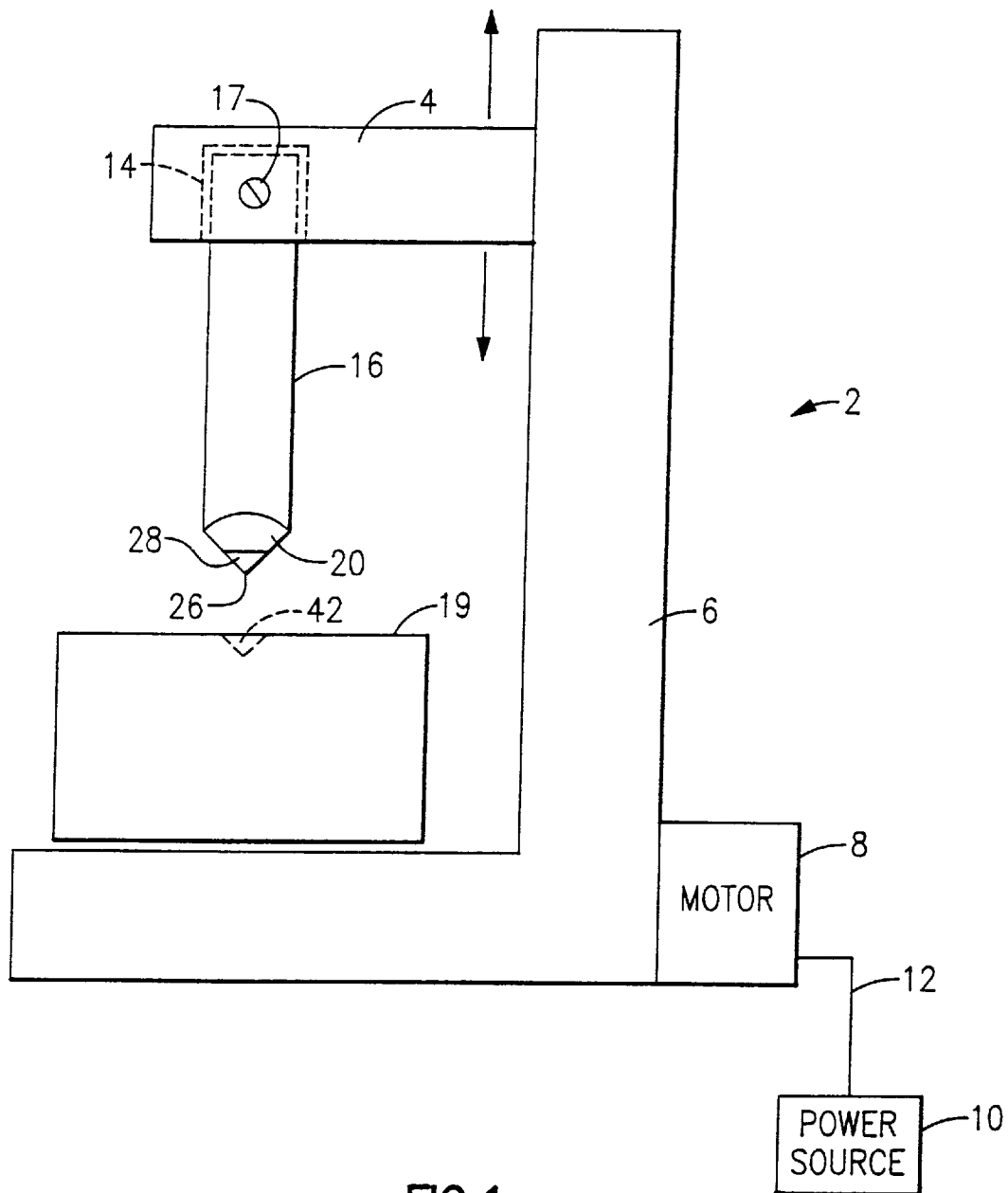
FIG. 1 is a diagrammatic elevational view of the marking system according to the present invention.

Turning now to FIG. 1, a detailed description concerning the present invention will now be provided. A marking device, generally designated by the reference numeral 2, comprises a movable arm 4 supported by a base member 6. Arm 4 is raised and lowered via a conventional drive mechanism (not shown) contained within base member 6. The drive mechanism is driven by motor 8 (e.g. hydraulic, pneumatic, etc.) which is powered by power source 10, typically provided externally of marking device 2. Power source 10 is connected to motor 8 by a power supply cable 12. The power source 10 is preferably an AC supply source, but may be any other power source, such as a battery, a DC power source, etc., suitable for powering the motor 8.

A gripping or clamping device 14, shaped to allow impact tool 16 to be received therein, is supported by a remote end portion of arm 4. Clamping device 14 typically includes a set screw 17, or some other suitable fastener for releasably securing impact tool 16 to clamping device 14.

Figure 2:
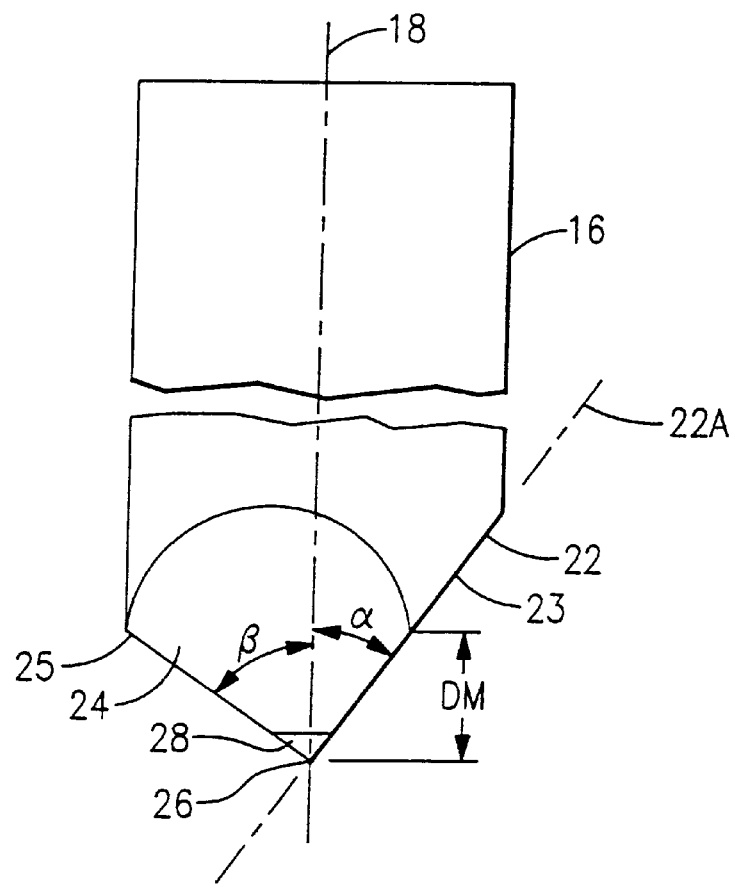
FIG. 2 is a diagrammatic elevational view of the impact tool according to present invention.
Figure 3:
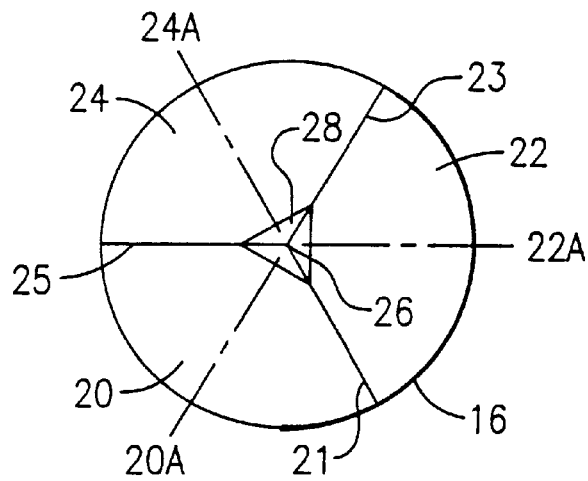
FIG. 3 is a diagrammatic bottom plan view of the impact tool of FIG. 2.

Turning now to FIGS. 2 and 3, the novel features of impact tool 16 can be seen in greater detail. Impact tool 16 is generally an elongate cylindrical member which defines a central longitudinal axis 18. The remote end of impact tool 16 has three substantially planar surfaces 20, 22, 24. Each of these three surfaces 20, 22, 24 intersects an adjacent surface 20, 22, or 24 to form ridges 21, 23, 25.

Each surface 20, 22, 24 defines a plane which is oriented at an angle α of approximately 35.2650°, measured at a centerline 20A, 22A, 24A of each surface 20, 22, 24, with respect to central longitudinal axis 18. Each surface 20, 22, 24 also lies perpendicular to each of the other two surfaces 20, 22, 24. Surfaces 20, 22, 24 intersect at a common point 26 located at the leading end of impact tool 16. Each ridge 21, 23, 25 forms an angle β of approximately 54.7350° with the central longitudinal axis 18.

The tip 28 of impact tool 16, comprising an area proximate point 26, is preferably made of an industrial grade diamond, or some other suitable material which is extremely hard and able to withstand repeated applications of large impact forces of impact tool 16 into other relatively hard surfaces without distorting, breaking, or otherwise losing the precise surface geometry of the tool.

All edges in the vicinity of tip 28, i.e. within about 0.01 inches of point 26, preferably have a maximum radius of curvature which is a small fraction of the depth of the indentation or cavity to be formed, e.g. a radius of curvature of less than about 5–10% of the depth of the indentation or the cavity to be formed. The impact tool 16 tip defines a maximum permissible depth DM of an indentation or cavity 42. That is, the maximum depth DM of an indentation or cavity 42 which can be formed by the impact tool is the length of any one of the ridges 21, 23 and 25 measured along the central longitudinal axis 18 of the tool.

When impact tool 16 is pressed or "stamped" into an exterior surface 19 of an object O to be marked, a corner cube indentation or cavity 42 (FIG. 5), which will be described in greater detail below, is formed in that surface. A plurality of corner cube cavities 42 are typically created on the surface 19 of object O in a desired arrangement or pattern (FIG. 12) which may, for example, be a bar code, a serial or part number, an alpha-numeric character, art work such as a logo or some other design.

The marking device 2 works in a manner similar to that used by dot matrix printers. Marking device 2 may include only one impact tool 16 used repeatedly or, if desired, may comprise a plurality of impact tools 16 closely arranged in an array, similar to that of a dot matrix printer which has multiple pins located adjacent one another, with each impact tool being individually actuatable. A computer (not shown) may control operation of the marking device 2 and each individual impact tool. As such computer control feature is well known to those skilled in this art, a further detailed description concerning the same is not provided herein.

It is to be appreciated that if an impact tool 16, having a corner cube tip as described with reference to FIGS. 2 and 3, is used to create a cavity in a surface made of a malleable material, the resulting cavity 42 will closely approximate the precise geometry of the impact tool 16 and behave in the manner disclosed by the present application. In practice, however, variations in the physical elasticity and the malleability of the material forming the exterior surface may cause a perfectly shaped corner cube impact tool 16 to leave a mark whose geometry deviates from the desired corner cube geometry due to "spring-back" of the material in which the cavity is being formed (FIG. 13). As can be seen in this figure, the original imprint of the impact tool 16 is shown by dashed lines OI while the final imprint of the cavity 42 is shown by solid line FI. The "spring-back" is in the direction shown by the unnumbered arrows. The amount of "spring-back" is typically greatest about the perimeter of the cavity and smallest at the deepest point of the cavity. Accordingly, such "spring-back" must be taken into consideration when designing the overall surface geometry of the tip portion of the impact tool 16.

As can be seen in FIG. 13, due to "spring-back" of the material forming the exterior surface 19 of object O, the resulting cavity 42 is not perfectly formed, i.e. the resulting angles vary from that of a perfect corner cube. In order to compensate for this phenomenon, the dimensions of the tip of the impact tool 16 are appropriately adjusted such that as the impact tool 16 impacts the surface to be marked, the cavity is initially formed oversized, shown by dotted line OV, i.e. greater than the desired cavity. Once the impact tool 16 is retracted from the marked surface, the cavity automatically reduces in size, due to the "spring-back" phenomenon, to the desired surface geometry. By taking the "spring-back" phenomenon into consideration, it is possible to design a precise impact tool for each kind or type of surface to be marked. Alternatively, instead of customizing the dimensions and/or shape of the impact tool for each material encountered, a series of tools may be fabricated which vary from the perfect geometry in small incremental steps, e.g. the angle α and β of the impact tool can be incrementally increased, by a quarter of a degree or so, for example, for each tool in the series.

For each given material and imprinting process, one of the tip geometries in the series of tools will yield a closer approximation to a perfectly formed corner cube cavity in the marked surface then the remaining tools. The best tool for marking a surface can quickly be checked by marking the surface to be marked once with each of the tools in the series and then visual observing each mark with coaxial light to determine which formed cavity more closely approximates a perfectly formed corner cube cavity, e.g. has the desired reflective optical properties.

The factors to be taken into account in designing the tip are the physical properties of the material to be imprinted as well as the marking process parameters, e.g. the temperature of the material to be imprinted, the duration of time that the impact tool remains in contact with the surface to be marked, the impact speed of the impact tool, the impact pressure of the imprinting tool, etc. It is to be appreciated that the required geometric distortion of the imprinting tool can be calculated from the measured physical properties of the material to be imprinted or may be determined empirically.

Figure 4:
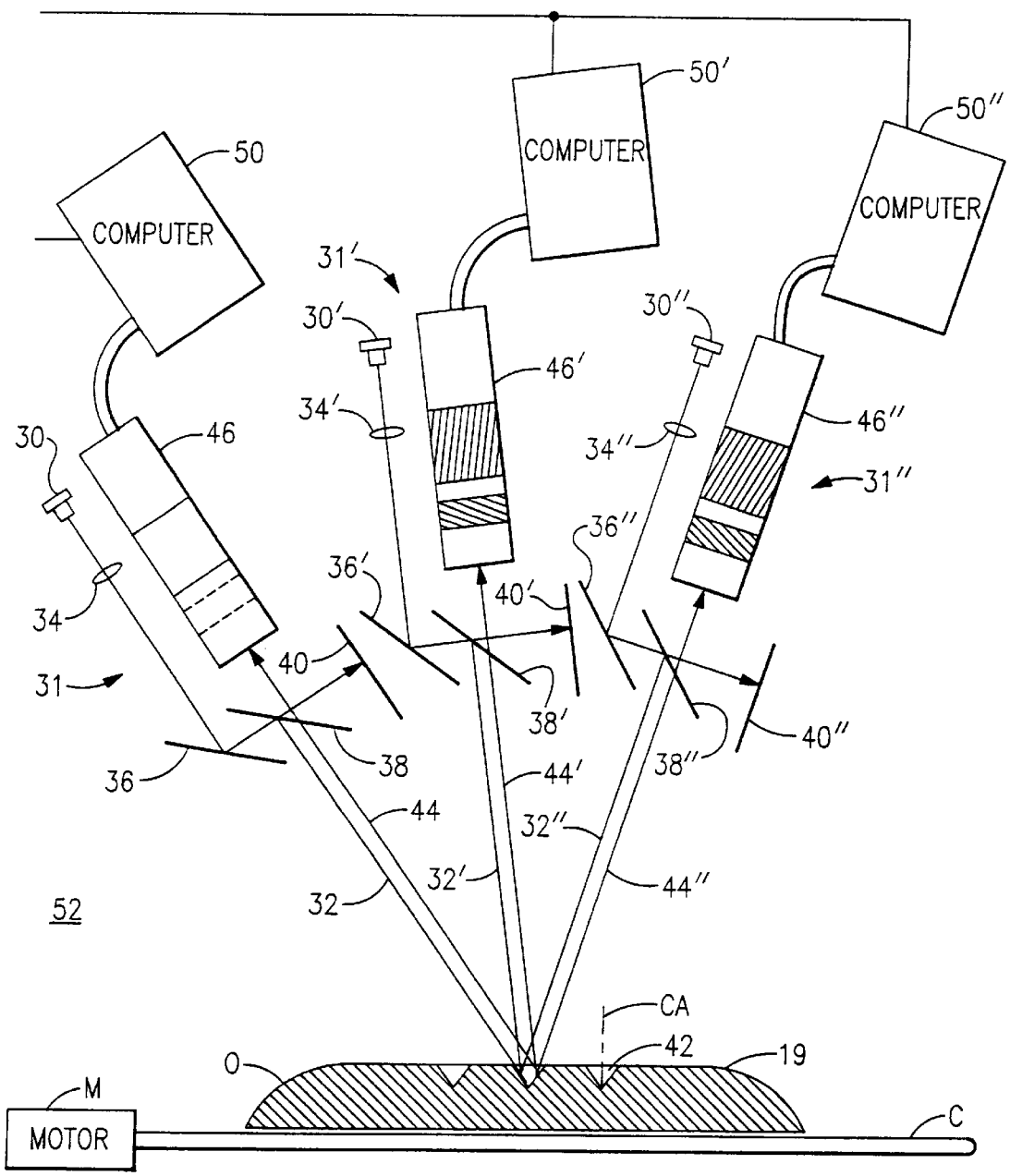
FIG. 4 is a diagrammatic partial cross-sectional view of a viewing apparatus according to the present invention.

Turning now to FIG. 4, a viewing apparatus, generally designated by the reference numeral 31, is shown. Viewing apparatus 31 comprises light source 30, which projects a light beam 32 toward the exterior surface 19 of object O containing the marking indicia. A collimating lens 34 is located proximate an output of light source 30 and along the travel path of light beam 32, in order to collimate light beam 32. A mirror 36 is located at an angle of 45°, relative to the original travel path of light beam 32, to reflect light beam 32 at a right angle toward beam splitter 38. Beam splitter 38 is aligned parallel to mirror 36 and reflects a portion of light beam 32, e.g. about 20–80% and typically about 50% of the light, toward the object O while the remainder of the light passes through beam splitter 38 and is absorbed by light trap 40, located behind and proximate beam splitter 38. The light beam 32 reflected toward object O, at a right angle relative to the light reflected by mirror 36, is supplied parallel to its original collimated path. As light source 30 is moved relative to object O by either automatic or manual means, collimated light beam 32 moves across object O as well, thereby at some point striking the corner cube indentation or cavity 42 marking(s) on the surface 19. Light beam 32 is then reflected back by the corner cube indentation or cavity 42 as light beam 44, parallel to light beam 32. A portion of light beam 44, e.g. usually about 20–80% and typically about 50% of the light, then passes through beam splitter 38 toward video camera 46 where the light is sensed and an image is determined by the camera by conventional technology. The sensed image may be supplied to a monitor or used during further manufacturing of an item or object.

The video camera 46 is connected with a computer 50 (only diagrammatically shown) for determining the sensed image, e.g. by a comparison of the sensed image with prior inputted images, characters, indicia, etc. Once the marking indicia on the surface 19 is determined by the system, the object O can then be further manipulated by the system, i.e. the object can be accepted or rejected, sorted by size or type, packaged, conveyed, etc., depending upon the particular application. Computer 50 is typically electrically connected by cable 52 to motor M, which drives conveyor C or some other transportation or conveying device for controlling further manipulation or manufacturing of the object O, e.g. for inspection, transportation, processing, orientation, etc.

Even if the viewing apparatus 31 is moved to a variety of other positions, the same effect results. As can be seen in FIG. 4, two alternate positions of the viewing apparatus 31 are shown in that Figure and designated as 31' and 31". Light sources 30' and 30" project light beams 32', 32" at different angles of incidence, with respect to object O, compared to light source 30. The geometry of corner cube cavities 42 insures that light beams 44' and 44" are reflected back, parallel to light beams 32' and 32", respectively. Marking indicia comprising of a plurality of corner cube cavities 42 can therefore be imaged from a wide variety of viewing angles. Because of the corner cube cavities 42 geometry, it will always reflect the light beam 32 directly back to the source as light beam 44, 44', 44" when the angle of incidence, in relation to the central axis of the cavity, is 35° or less.

Turning now to FIG. 5, corner cube indentation or cavity 42 can be seen in greater detail. Corner cube cavity 42, formed as a depression in an exterior surface 19 of an object O, comprises three planar surfaces 48, 50, 52. Each surface 48, 50, 52 is formed by surfaces 20, 22, 24, respectively, of impact device 16 striking the exterior surface 19 of object O. Surfaces 48, 50, 52, in the same manner as surfaces 20, 22, 24, are perpendicular to one another and form a point 54 at their intersection, within object O. It is to be appreciated that the three formed ridges 49, 51, 53 of the indentation or cavity as well as the point have a substantially identical radius of curvature to that of the tool 16.

Due to the geometry of corner cube cavity 42, virtually all the incoming collimated light of light beam 32 is reflected back as light beam 44, parallel to light beam 32, as can be seen in FIG. 4. It is also possible that light beam 32 may be reflected directly back along its incoming path when it strikes a single surface 48, 50 or 52 at an angle normal to that surface 48, 50, 52. In all other instances, light beam 32 will always be reflected back by two or three of surfaces 48, 50, 52 before being returned or reflected back as light beam 44 parallel to the path of light beam 32, as long as the angle of incidence of the light is 35° or less in relation to a central axis CA (FIGS. 4 and 9) extending normal to the indentation or cavity 42.

In a preferred embodiment, the surface 48, 50, 52 of each corner cube cavity 42 has a highly polished inner surface microfinish. Ridges 49, 51, 53 are formed between adjacent surfaces 48, 50, 52.

Since a substantial portion of the supplied light beam 32 is reflected back as light beam 44 to video camera 46, a relatively low-powered highly focused light source, such as an LED or diode laser, will cause the corner cube cavities 42, and thus any pattern created by multiple corner cube cavities 42, to appear extremely bright relative to ambient light. The high intensity of the reflected light allows a small aperture to be used on the video camera 46, thus creating a great depth of focus which allows the corner cube cavities 42 to be viewed from a variety of different viewing distances and angles.

A second embodiment of the viewing apparatus according to the invention is shown in FIG. 6. Viewing apparatus 56 comprises light source 58, which projects a desired dimension light band 60 toward the surface 19 of object O. Collimating lens 62 is located proximate light source 58 and along the travel path of light band 60, in order to collimate light band 60. A mirror 64 is located at an angle of about 45°, relative to the uncollimated original travel path of light band 60, to reflect light band 60 at a right angle toward beam splitter 66. Beam splitter 66 reflects a portion of light band 60, e.g. usually about 20–80% and typically about 50% of the light, toward the object O while the remainder of the light passes through beam splitter 66 and is absorbed by light trap 68, located behind and proximate beam splitter 38. The portion of light band 60 that is reflected toward object O, at a right angle relative to the collimated light reflected from mirror 64, is supplied parallel to the original collimated light path.

As light source 58 is moved relative to object O, light band 60 moves across object O as well, thereby striking corner cube cavities 42 formed in the surface and along the light source path of movement. Light band 60 strikes the surface 19 of object O and the angle of reflection depends on the area of the exterior surface 19 contacted. A portion of light band 60 is reflected by the unmarked exterior surface 19 to the surrounding environment as light beam 70' while a portion of light band 60 is reflected back, by the corner cube cavities 42, as light beam 70, parallel to light band 60. A portion of the reflected light beams 70 then pass through beam splitter 66 and is sensed by video camera 72 and processed into an image as with the prior embodiment.

As can be seen in FIGS. 7A and 7B, unless the supplied light is accurately positioned with respect to the prior art cone or conical indentations, i.e. supplied substantially normal to the surface containing the cone or conical indentation, an insufficient amount of light is reflected by the cone or conical indentation back to the light source for sensing by the sensing device. That is, only a small portion of the entire area of the indentation is perceived as being illuminated by the sensing device and this may lead to viewing errors.

The corner cube indentation according to the present invention (FIG. 7C), on the other hand, always provides sufficient illumination of the entire area of each indentation or cavity, directly perceivable or viewable by the sensing device, as long as the supplied light forms an angle of 35°or less with a central axis CA extending normal to the opening of the indentation or cavity. Accordingly, the sensing device is able to discern readily virtual the entire viewable cavity or planar surface of each marking indicia formed on a surface to be viewed.

Video camera 72 may be a one-dimension line scan video camera or a two-dimension area camera or two-dimension array video camera. Since line scan cameras have significantly higher resolution in one dimension than a typical two-dimension array video camera, wider areas can be imaged by this technique at an equivalent resolution. For example, a two-dimensional camera may image a single character or marking pattern, while a number of one-dimensional line scan cameras 72 operating in parallel may image an area of arbitrary width including an arbitrary number of marks.

It is to be appreciated that the corner cube cavity 42 alternatively may be formed by a molding process, or may be etched into the surface 19 of object O by photo-chemical, photo lithograph, or mechanical means, with the cavity size and spacing being appropriately selected depending upon the application. A further description concerning one possible etching technique follows hereinafter.

Turning now to FIGS. 8–12, a further embodiment of the present invention will now be discussed. According to this embodiment, the corner cube indentation or cavity 42' is either etched into a surface or built up through superimposing a plurality of successive layers of art work, in a conventional manner, onto a substrate 80, for example as part of the art work making up a semiconductor circuit.

With reference to FIGS. 8 and 9, a corner cube cavity can be seen which effectively has three substantially or effectively planar surfaces 20', 22' and 24'. Each of these effectively planar surfaces is formed by a plurality of different layers 82 forming the art work. As can be seen in FIG. 9, the art work is stepped and a plane extending through a center of the steps forms an angle α of approximately 35.270° with a central axis CA of the corner cube cavity. Each formed cavity typically has a width (W) and a depth (D) which is approximately 0.47times the width (W).

As can be seen in this embodiment, ten (10) separate layers 82 of art work are used to form the indentation or cavity 42'. It is to be appreciated that a number of layers of superimposed art work can vary from application to application depending upon specific requirements of the marking indicia and the wavelength of the light to be reflected. Because of the superimposed successive layers of art work, each formed reflective wall of the reflective cavity has a "stepped" appearance. The size of the steps is dependent upon the wavelength of the particular light to be reflected so that the formed steps reflect the supplied light almost as well as if the cavity walls were truly planar instead of being a "stepped" surface which effectively functions as a planar surface.

The discrete reflective cavity patterns can be laid out in a repetitive hexagonal array to create a homogeneous reflective area or areas. For example, the cavities can be formed into a pattern which is representative of the letter M (FIG. 12) or any other desired character, numeral, emblem, logo, and/or other design. The reflective area etching has the advantage of greatly simplifying the optics and the illumination used to image such art work.

It is to be appreciated that the overall dimensions of the corner cube cavity 24' etched in a surface can be varied as long as the overall proportions of the corner cube cavity is retained. In addition, the number and thickness of the layers forming the corner cube cavity can vary depending upon the application and the wavelength of the light to be reflected by the corner cube cavity. It is important to remember that as long as the overall dimensions of the corner cube cavity are maintained, the cavity will function in the manner disclosed by the present application.

Currently, alphanumeric art work is created on semiconductor surfaces through one of two known methods, i.e. a "hard mark" process or a "soft mark" process. According to the "hard mark" process, an industrial laser is used to create desired pits in the surface of the semiconductor wafer with the patterns of the pits making up the desired art work. This method has the disadvantage of creating debris, during creation of the pits, which become problematic during the remainder of the semiconductor fabrication process, i.e. contamination.

In the "soft mark" process, art work for such soft markings are included in the art work as part of the multiple layers of the semiconductor circuitry. Successive layers result in broad flat marks whose edges are in the form of a gentle sloped, stair-stepped pattern. The gentle slop of the edges of the soft art work in a semiconductor surface can be imaged through the use of precise alignment of a camera and a light source supplied other than along the viewing axis. Soft marks appear in the field of view in outline form, either as bright areas on a dark field (if light is supplied other than along the viewing axis) or as dark areas on a bright field (if precise collimated co-axial illumination is employed). The degree of precision required for imaging a "soft mark" is a significant technical problem. However, one advantage of the "soft mark" process is that the mark is made as part of the normal semiconductor etching process and is, therefore, fairly clean. This is an important consideration in a process where high yield of large high-density semiconductor components is required.

The advantage of the built up art work, according to the present invention, is that the art work can be imaged with a simple co-axial illumination source from any angle except precisely perpendicular to the surface; the art work is created in the same manner as the current "soft mark" process; the reflective art work can fill a solid contiguous area rather than appearing either as a disconnected dots or a thin edged pattern; and the imaging device used to read art work is identical to that use to image art work through mechanical impact or other types of surfaces.

While a true corner cube has a geometry which yields the greatest optical efficiency and flexibility of use, imprinting of a mark with either one or two optically reflective planar surfaces, which do not necessarily form a corner cube reflector, is itself a marked improvement over conical or spherical marks. This is because for any given reflection plane there exists a viewing angle and an illumination angle which yields a nearly complete reflection of the marking on the surface by using a small coaxial light source while imprinted conical marks require a ring of illumination of a specific geometry in order to facilitate complete reflection of the mark. Spherical imprints, on the other hand, can only provide a partial reflection of the mark regardless of the illumination geometry.

It is to be appreciated that an imperfectly formed corner cube cavity will still exhibit substantially complete reflection of the mark, when viewed via a coaxial illumination source, from any of three particular viewing angles, i.e. the particular viewing angles correspond to viewing axes which extend normal to each of the three planar surfaces forming the cavity.

A simple two-sided wedge, having a pair of planar surfaces 48', 50' formed thereon, will also yield an imprinted mark which is suitable for reflecting, via coaxial illumination, an image of the marking along two viewing axes VA1, VA2 (FIG. 14). The two viewing axes extend perpendicular to each one of the two planar reflective surfaces 48', 50' of the mark formed in the surface 19'. Lastly, it is also possible to employ an impact device which has a single planar surface thereon which also yield an imprinted mark suitable for reflecting, via coaxial illumination, an imaging of the marking along a single viewing axis VA1, with the viewing axis VA1 extends perpendicular to planar reflective surface 48" formed in the cavity (FIG. 15).

In each of the above cases, the unifying principle is that a camera and coaxial illumination source are used to image a mark incorporating at least one planar reflective surface whose reflective geometry causes the coaxial illumination to be efficiently reflected back along the viewing axis. It is to be borne in mind that if the cavities formed in the surface comprise either a single or a pair of planar reflective surfaces, as opposed to true corner cavities, then all of the planar surfaces which are formed in the marked surface must lie or extend parallel to one another if only one planar reflective surface is imprinted or aligned in the same direction if two planar reflective surfaces are imprinted, i.e. the orientation of the impact tool 16 relative to the surface to be marked must not be changed or altered during the marking process so that all of the markings can be viewed by an observation device at the same viewing angle or orientation.

It is to be appreciated that the illumination device disclosed in U.S. Pat. No. 5,461,417 issued Oct. 24, 1995 can be used to illuminate the markings according to the present invention, and such teaching is incorporated herein by reference.

Since certain changes may be made in the above described marking indicia and observation system, without departing from the spirit and scope of the invention herein involved, it is intended that all of the subject matter of the above description or shown in the accompanying drawings shall be interpreted merely as examples illustrating the inventive concept herein and shall not be construed as limiting the invention.

Wherefore we claim:

1. An inspection system comprising a surface marking system, for providing a reflective marking in a surface, used in combination with a vision system, for inspecting said marking indicia, said surface marking system comprising:
   a mechanism for forming a plurality of corner cube cavities in the surface to be marked, each of said plurality of corner cube cavities comprising three surfaces, each of said three surfaces lying perpendicular to one another and intersecting one another at a point common to all of said three surfaces, a ridge being formed between each mating adjacent pairs of said three substantially planar surfaces, and said plurality of corner cube cavities being arranged in a pattern to form a desired marking indicia; and
   said vision system, for inspecting said marking indicia, comprising:
      a substantially collimated light source for directing substantially collimated light substantially along an inspection axis toward said plurality of corner cube cavities;
   said plurality of corner cube cavities, formed in said surface of said object, reflecting said substantially collimated light substantially along said axis; and
   a sensing device for sensing and producing an image of said plurality of corner cube cavities from the light returned substantially along said axis.

2. The inspection system according to claim 1, wherein said substantially collimated light source comprises:
   a light source;
   a collimating lens located proximate said light source for substantially collimating light supplied by said light source; and
   a beam splitter for reflecting a portion of said light supplied by said light source along said axis.

3. The inspection system according to claim 2, wherein said surface marking system further comprises:
   an impact device;
   an impact tool attached to said impact device for forming said corner cube cavity; and
   said impact tool has a central axis, and an angle formed between said central axis and each of said three surfaces, measured along a center line of each of said substantially planar surfaces, is about 35.3°.

4. The inspection system according to claim 3, wherein an angle formed between said central axis and each of said ridges is about 54.7°.

5. The inspection system according to claim 3, wherein at least a tip portion of said impact tool is formed from an industrial grade diamond and said tip portion has a modified surface geometry, to compensate for spring back characteristics of said surface to be marked following formation of said desired corner cube cavity therein, thereby to form a plurality of nearly perfect corner cube cavities in said surface to be marked.

6. The inspection system according to claim 3, wherein said impact tool, within about 0.01 inches of said point, has an optical quality mirror finish.

7. The inspection system according to claim 3, wherein all edges within 0.01 inches of said point have a maximum radius of about 5 $\mu$m.

8. The inspection system according to claim 3, wherein said surface marking system further comprises a plurality of impact tools attached to said impact device for forming a desired marking pattern in the surface to be marked.

9. The inspection system according to claim 1, wherein said substantially collimated light source comprises:
   a light source;
   a collimating lens located proximate said light source for substantially collimating light supplied by said light source;
   a mirror for reflecting said light supplied by said light source; and
   a beam splitter for reflecting a portion of said light reflected from said mirror toward said surface along said axis.

10. The inspection system according to claim 3, wherein said sensing device is at least one two-dimensional camera.

11. The inspection system according to claim 10, wherein a light trap is located adjacent said beam splitter for absorbing light passing therethrough.

12. The system according to claim 1, further comprising a computing mechanism which is electrically coupled to said inspection system, and a conveying mechanism which is electrically coupled to said computing mechanism, and said sensing device supplies a sensed image, of said plurality of corner cube cavities, to said computing mechanism which determines said marking indicia carried by said marked surface and outputs a signal to said conveying mechanism to control further manipulation of an object having said marked surface in view of said determined marking indicia.

13. A method of marking a surface with a reflective marking indicia for viewing by an inspection system, said method comprising the steps of:
   forming a plurality of corner cube cavities in the surface to be marked, each of said plurality of corner cube cavities comprising three surfaces, each of said three surfaces extending perpendicular to one another and intersecting one another at a point common to all of said three surfaces, and a ridge being formed between each mating adjacent pairs of said three surfaces;
   said plurality of corner cube cavities being formed in a pattern to form a desired marking indicia in the surface;
   supplying light, substantially along an inspection axis, toward said surface carrying said plurality of corner cube cavities;
   reflecting a portion of said supplied light, from said plurality of corner cube cavities, back along said inspection axis substantially parallel to the supplied light; and
   sensing said light reflected by said corner cube cavities with a sensing device and determining said marking indicia formed in said marked surface from said sensed reflected light.

14. The method according to claim 13, wherein the forming step comprises stamping said surface to be marked with an impact tool a plurality of times, and the stamping tool has a tip formation for forming said corner cube cavity in said surface, and said tip portion having a modified surface geometry, to compensate for spring back characteristics of said surface to be marked following formation of said desired corner cube cavity therein, thereby to form a plurality of nearly perfect corner cube cavities in said surface to be marked.

15. The method according to claim 13, further comprising the steps of:
   substantially collimating said light prior to supplying the light toward the surface;
   directing said substantially collimated light at a beam splitter; and
   reflecting, via said beam splitter, at least a portion of said substantially collimated light toward said surface;
   allowing a portion of the light reflected by said plurality of corner cube cavities formed in the surface to pass through said beam splitter; and
   sensing the light, from said plurality of corner cube cavities, passing through said beam splitter by the sensing device.

16. A reflective surface marking system for providing a surface with a reflective marking and for inspecting said marking with a vision system, said system comprising:
   a mechanism for forming a plurality of markings in the surface on an object to be marked, each of said plurality of markings, formed by said mechanism, having at least one planar reflective surface, and said mechanism forming said plurality of markings in the surface to be marked so as to form a desired reflective marking indicia; and
   said vision system comprising:
      a light source for supplying light toward said surface having said plurality of markings, with at least one planar reflective surface, with said supplied light being supplied at an angle of incidence extending substantially normal to said at least one planar reflective surface of said plurality of markings;
      said plurality of markings with at least one planar reflective surface, when illuminated with light supplied at an angle of incidence being substantially normal to said at least one planar surface of said plurality of markings, reflecting said supplied light back along a return direction extending substantially parallel to said supplied light; and
      a sensing device for sensing and producing an image, of said plurality of markings with at least one planar reflective surface, from the light reflected back from said plurality of markings, with at least one planar reflective surface, to determine the reflective marking indicia in the surface, and said sensing device being spaced from said plurality of markings a sufficient distance so as to receive only the light reflected by said at least one planar surface, of said plurality of markings, while light reflected by an adjacent area, surrounding each of said plurality of markings, being reflected away from an input of said sensing device.

17. The system according to claim 16, wherein said light source is a substantially collimated light source which comprises:
   a light source;
   a collimating lens located proximate said light source for substantially collimating the light supplied by said light source; and
   a beam splitter for reflecting a portion of said light supplied by said light source along an observation axis extending between said plurality of markings and the sensing device.

18. The system according to claim 16, wherein said mechanism for forming said plurality of markings, with at least one planar reflective surface, in the surface to be marked comprises:
   an impact device;
   an impact tool attached to said impact device; and
   said impact tool has a central axis and tip with a substantially planar surface formed thereon for forming said at least one planar surface.

19. The system according to claim 16, further comprising:
- a beam splitter for reflecting a portion of said light supplied by said light source toward said surface;
- at least one substantially planar surface formed in said surface of said object by said impact tool for returning said light reflected by said beam splitter toward said surface; and
- said beam splitter allowing a portion of the light returned from said at least one substantially planar surface in said surface to pass through said beam splitter and be sensed by said sensing device.

20. The system according to claim 16, further comprising a computing mechanism which is electrically coupled to said sensing device, and a conveying mechanism which is electrically coupled to said computing mechanism, and said sensing device supplies a sensed image, of said plurality of markings with at least one planar reflective marking, to said computing mechanism which determines the marking indicia carried by said marked surface and outputs a signal to said conveying mechanism to control further manipulation of the object having the determined marking indicia.

* * * * *